United States Patent
Oh et al.

(10) Patent No.: US 10,331,013 B2
(45) Date of Patent: Jun. 25, 2019

(54) ACTUATOR OF CAMERA MODULE

(71) Applicant: Samsung Electro-Mechanics Co., Ltd., Suwon-si (KR)

(72) Inventors: Suk Young Oh, Suwon-si (KR); Je Hyun Bang, Suwon-si (KR); Hong Joo Lee, Suwon-si (KR); Young Bok Yoon, Suwon-si (KR); Hoon Heo, Suwon-si (KR); Jung Seok Lee, Suwon-si (KR); Ick Chan Shim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/942,672

(22) Filed: Apr. 2, 2018

(65) Prior Publication Data
US 2018/0284568 A1   Oct. 4, 2018

(30) Foreign Application Priority Data

Apr. 3, 2017  (KR) .................. 10-2017-0043229
Dec. 22, 2017  (KR) .................. 10-2017-0177954
Mar. 29, 2018  (KR) .................. 10-2018-0036430

(51) Int. Cl.
*G03B 5/00* (2006.01)
*G02B 27/64* (2006.01)
*H04N 5/232* (2006.01)

(52) U.S. Cl.
CPC ............ *G03B 5/00* (2013.01); *G02B 27/646* (2013.01); *G03B 2205/0007* (2013.01); *G03B 2205/0069* (2013.01); *H04N 5/23248* (2013.01); *H04N 5/23287* (2013.01)

(58) Field of Classification Search
CPC ........................................................ G03B 5/00
USPC ............................................................. 396/55
See application file for complete search history.

(56) References Cited

U.S. PATENT DOCUMENTS

| | | | |
|---|---|---|---|
| 4,318,598 A * | 3/1982 | Fukuhara | G02B 7/36 396/110 |
| 2013/0163085 A1* | 6/2013 | Lim | H02K 41/0356 359/557 |
| 2013/0169832 A1* | 7/2013 | Park | H04N 5/232 348/208.2 |
| 2018/0074283 A1* | 3/2018 | Ko | H02P 7/02 |
| 2018/0095341 A1* | 4/2018 | Lee | G03B 3/10 |
| 2018/0149828 A1* | 5/2018 | Choi | G02B 7/09 |
| 2018/0152608 A1* | 5/2018 | Lee | H04N 5/2253 |

FOREIGN PATENT DOCUMENTS

| | | | |
|---|---|---|---|
| JP | 2009-271204 A | 11/2009 | |
| JP | 2012177754 | * 9/2012 | ............ G03B 5/00 |
| JP | 2014-191092 A | 10/2014 | |
| KR | 10-2013-0072721 A | 7/2013 | |
| KR | 10-2013-0077216 A | 7/2013 | |

* cited by examiner

Primary Examiner — Clayton E. LaBalle
Assistant Examiner — Kevin C Butler
(74) Attorney, Agent, or Firm — NSIP Law

(57) ABSTRACT

An actuator of a camera module includes: a detection target; and a position detecting unit disposed to face the detection target and including at least two sensing coils respectively forming at least two oscillation circuits, wherein the position detecting unit detects a position of the detection target depending on at least two oscillation signals generated by the at least two oscillation circuits and having different frequency ranges.

20 Claims, 7 Drawing Sheets

US 10,331,013 B2

ACTUATOR OF CAMERA MODULE

CROSS-REFERENCE TO RELATED APPLICATIONS

This application claims the benefit under 35 USC 119(a) of Korean Patent Application Nos. 10-2017-0043229 filed on Apr. 3, 2017, 10-2017-0177954 filed on Dec. 22, 2017, and 10-2018-0036430 filed on Mar. 29, 2018, in the Korean Intellectual Property Office, the entire disclosures of which are incorporated herein by reference for all purposes.

BACKGROUND

1. Field

The present disclosure relates to an actuator of a camera module.

2. Description of Related Art

Recently, portable communications terminals such as cellular phones, personal digital assistants (PDAs), portable personal computers (PCs), or the like, have generally been implemented with the ability to perform the transmission of video data, as well as transmission of text or audio data. In accordance with such a trend, camera modules have recently been standardly installed in portable communications terminals in order to enable the transmission of the video data, video chatting, or the like.

Generally, a camera module includes a lens barrel having lenses disposed therein, a housing accommodating the lens barrel therein, and an image sensor converting an image of a subject into an electrical signal. A single focus type camera module capturing an image of a subject at a fixed focus may be used as the camera module. However, recently, in accordance with the development of technology, a camera module including an actuator enabling autofocusing (AF) has been used. In addition, such a camera module includes an actuator for optical image stabilization (OIS) in order to suppress a resolution decrease phenomenon due to hand-shake.

SUMMARY

An aspect of the present disclosure may provide an actuator of a camera module capable of precisely detecting a position of a magnet without using a hall sensor.

According to an aspect of the present disclosure, an actuator of a camera module may include: a detection target; and a position detecting unit disposed to face the detection target and including at least two sensing coils respectively forming at least two oscillation circuits, wherein the position detecting unit detects a position of the detection target depending on at least two oscillation signals generated by the at least two oscillation circuits and having different frequency ranges.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
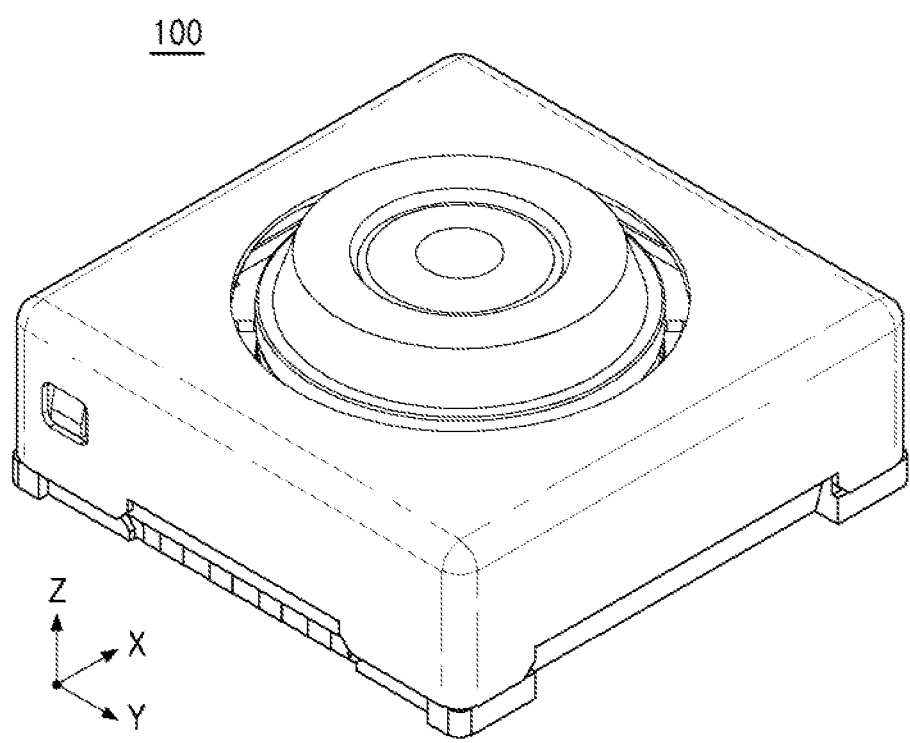
FIG. 1 is a perspective view illustrating a camera module according to an exemplary embodiment in the present disclosure.
Figure 2A:
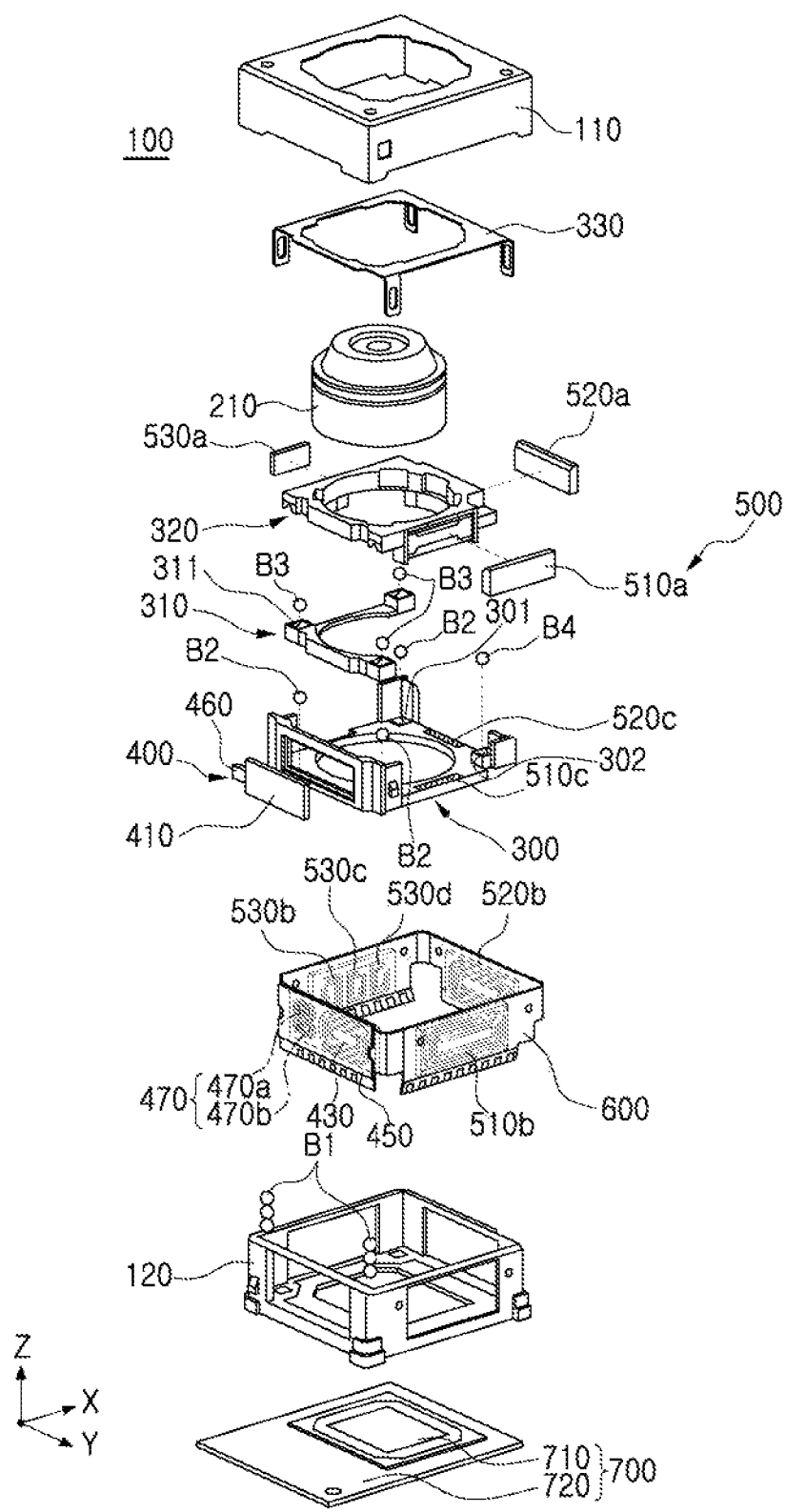
FIG. 2A is a schematic exploded perspective view illustrating the camera module according to an exemplary embodiment in the present disclosure.
Figure 2B:
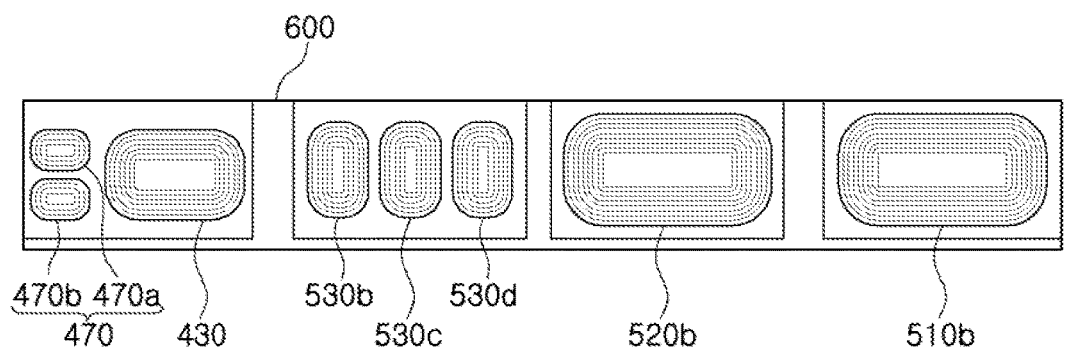
FIG. 2B is a development view illustrating sensing coils and driving coils disposed on a substrate according to an exemplary embodiment in the present disclosure.

FIG. 1 is a perspective view illustrating a camera module according to an exemplary embodiment in the present disclosure, FIG. 2A is a schematic exploded perspective view illustrating the camera module according to an exemplary embodiment in the present disclosure, and FIG. 2B is a view illustrating sensing coils and driving coils disposed on a substrate according to an exemplary embodiment in the present disclosure.

Referring to FIGS. 1 through 2B, a camera module 100 according to an exemplary embodiment in the present disclosure may include a lens barrel 210, an actuator moving the lens barrel 210, and a case 110 and a housing 120 accommodating the lens barrel 210 and the actuator therein, and may further include an image sensor module 700 converting light incident thereto through the lens barrel 210 into an electrical signal.

The lens barrel 210 may have a hollow cylindrical shape so that a plurality of lenses capturing an image of a subject may be accommodated therein, and the plurality of lenses may be mounted in the lens barrel 210 along an optical axis. The number of lenses disposed in the lens barrel 210 may depend on a design of the lens barrel 210, and the respective lenses may have optical characteristics such as the same refractive index or different refractive indices, or the like.

The actuator may move the lens barrel 210. As an example, the actuator may move the lens barrel 210 in an optical axis (Z-axis) direction to focus the lenses, and may move the lens barrel 210 in a direction perpendicular to the optical axis (the Z axis) to correct shake at the time of capturing an image. The actuator may include a focusing unit 400 focusing the lenses and a shake correction unit 500 correcting the shake.

The image sensor module 700 may convert the light incident thereto through the lens barrel 210 into the electrical signal. As an example, the image sensor module 700 may include an image sensor 710 and a printed circuit board 720 connected to the image sensor 710, and may further include an infrared filter. The infrared filter may cut off light in an infrared region in the light incident thereto through the lens barrel 210. The image sensor 710 may convert the light incident thereto through the lens barrel 210 into the electrical signal. As an example, the image sensor 710 may include a charge coupled device (CCD) or a complementary metal oxide semiconductor (CMOS). The electrical signal converted by the image sensor 710 may be output as an image through a display unit of a portable electronic device. The image sensor 710 may be fixed to the printed circuit board 720, and may be electrically connected to the printed circuit board 720 by wire bonding.

The lens barrel 210 and the actuator may be accommodated in the housing 120. As an example, the housing 120 may have a shape of which the top and the bottom are opened, and the lens module 210 and the actuator may be accommodated in an internal space of the housing 120. The image sensor module 700 may be disposed on the bottom of the housing 120.

The case 110 may be coupled to the housing 120 to surround outer surfaces of the housing 120, and may protect internal components of the camera module 100. In addition, the case 110 may shield electromagnetic waves. As an example, the case 110 may shield electromagnetic waves generated by the camera module so that the electromagnetic waves do not have an influence on other electronic components in the portable electronic device. In addition, since several electronic components as well as the camera module are mounted in the portable electronic device, the case 110 may shield electromagnetic waves generated by these electronic components so that the electromagnetic waves do not have an influence on the camera module. The case 110 may be formed of a metal and be grounded to a ground pad provided on the printed circuit board 720 to shield the electromagnetic waves.

The actuator according to the exemplary embodiment in the present disclosure may move the lens barrel 210 in order to focus the lenses on the subject. As an example, the actuator may include the focusing unit 400 moving the lens barrel 210 in the optical axis (Z-axis) direction.

The focusing unit 400 may include a magnet 410 and a driving coil 430 generating driving force to move the lens barrel 210 and a carrier 300 accommodating the lens barrel 210 therein in the optical axis (Z-axis) direction.

The magnet 410 may be mounted on the carrier 300. As an example, the magnet 410 may be mounted on one surface of the carrier 300. The driving coil 430 may be mounted on the housing 120, and may be disposed to face the magnet 410. As an example, the driving coil 430 may be disposed on one surface of a substrate 600, and the substrate 600 may be mounted on the housing 120.

The magnet 410 may be mounted on the carrier 300 to thus be moved in the optical axis (Z-axis) direction together with the carrier 300, and the driving coil 430 may be fixed to the housing 120. However, according to another exemplary embodiment, positions of the magnet 410 and the driving coil 430 may be exchanged with each other.

When a driving signal is applied to the driving coil 430, the carrier 300 may be moved in the optical axis (Z-axis) direction by electromagnetic interaction between the magnet 410 and the driving coil 430.

Since the lens barrel 210 is accommodated in the carrier 300, the lens barrel 210 may also be moved in the optical axis (Z-axis) direction by the movement of the carrier 300. In addition, since a frame 310 and a lens holder 320 are also accommodated in the carrier 300, the frame 310, the lens holder 320, and the lens barrel 210 may also be moved together in the optical axis (Z-axis) direction by the movement of the carrier 300.

Rolling members B1 may be disposed between the carrier 300 and the housing 120 to reduce friction between the carrier 300 and the housing 120 when the carrier 300 is moved. The rolling members B1 may have a ball form. The rolling members B1 may be disposed at both sides of the magnet 410.

A yoke 450 may be disposed on the housing 120. As an example, the yoke 450 may be mounted on the substrate 600 and be disposed on the housing 120. The yoke 450 may be provided on the other surface of the substrate 600. Therefore, the yoke 450 may be disposed to face the magnet 410 with the driving coil 430 interposed therebetween. Attractive force may act in a direction perpendicular to the optical axis (a Z axis) between the yoke 450 and the magnet 410. Therefore, the rolling members B1 may be maintained in a state in which they are in contact with the carrier 300 and the housing 120 by the attractive force between the yoke 450 and the magnet 410. In addition, the yoke 450 may collect magnetic force of the magnet 410 to prevent generation of a leaked magnetic flux. As an example, the yoke 450 and the magnet 410 may form a magnetic circuit.

In the present disclosure, in a focusing process, a closed loop control manner of sensing and feeding back a position of the lens barrel 210 may be used. Therefore, the focusing unit 400 may include a position detecting unit in order to perform a closed loop control. The position detecting unit may include autofocusing (AF) sensing coils 470a and 470b. The AF sensing coils 470a and 470b may be disposed along the optical axis (the Z axis). Inductances of the AF sensing coils 470a and 470b may be changed depending on movement of the magnet 410 facing the AF sensing coils 470a and 470b. The position detecting unit may detect the position of the lens barrel 210 from the changes in the inductances of the AF sensing coils 470a and 470b depending on the movement of the magnet 410 in the optical axis (Z-axis) direction. According to another exemplary embodiment, the focusing unit 400 may further include a first sensing yoke 460 disposed at one side of the magnet 410 to face the AF sensing coils 470a and 470b. The first sensing yoke 460 may be mounted on the carrier 300 to be thus moved together with the carrier 300 in the optical axis (Z-axis) direction. The first sensing yoke 460 may be formed of at least one of a conductor and a magnetic material. When the first sensing yoke 460 is provided, the position detecting unit may detect the position of the lens barrel 210 from the changes in the inductances of the AF sensing coils 470a and 470b depending on the movement of the first sensing yoke 460 in the optical axis (Z-axis) direction. That is, the inductances of the AF sensing coils 470a and 470b may be changed depending on a displacement of the magnet 410 or the first sensing yoke 460. When the magnet 410 or the first sensing yoke is moved in the optical axis (Z-axis) direction, areas of the magnet 410 or the first sensing yoke overlapping the AF sensing coils 470a and 470b may be changed, and the inductances of the AF sensing coils 470a and 470b may thus be changed.

The position detecting unit of the focusing unit 400 may further include one or more capacitors in order to determine a displacement of the lens barrel 210 from the changes in the inductances of one or more AF sensing coils 470a and 470b. One or more capacitors and one or more AF sensing coils 470a and 470b may form a predetermined oscillation circuit. As an example, the number of capacitors may correspond to that of AF sensing coils 470a and 470b, and one capacitor and one sensing coil may be configured in a form such as a predetermined LC oscillator or be configured in a form such as any well-known Colpitts oscillator.

The position detecting unit of the focusing unit 400 may determine the displacement of the lens barrel 210 from a change in a frequency of an oscillation signal generated by the oscillation circuit. In detail, when the inductances of the AF sensing coils 470a and 470b forming the oscillation circuit are changed, the frequency of the oscillation signal generated by the oscillation circuit may be changed, and the displacement of the lens barrel 210 may thus be detected on the basis of the change in the frequency of the oscillation signal.

The shake correction unit 500 may be used in order to correct image blurring or moving picture shaking due to a factor such as hand-shake of a user at the time of capturing an image or a moving picture. For example, when the shake is generated at the time of capturing the image due to the hand-shake of the user, or the like, the shake correction unit 500 may compensate for the shake by allowing the lens barrel 210 to be relatively displaced to correspond to the shake. As an example, the shake correction unit 500 may move the lens barrel 210 in the direction perpendicular to the optical axis (the Z axis) to correct the shake.

The shake correction unit 500 may include a plurality of magnets 510a and 520a and a plurality of driving coils 510b and 520b generating driving force to move a guide member in the direction perpendicular to the optical axis (the Z axis). The frame 310 and the lens holder 320 may be inserted into the carrier 300, be disposed in the optical axis (Z-axis) direction, and guide the movement of the lens barrel 210. The frame 310 and the lens holder 320 may have a space into which the lens barrel 210 may be inserted. The lens barrel 210 may be inserted and fixed into the lens holder 320.

The frame 310 and the lens holder 320 may be moved in the direction perpendicular to the optical axis (the Z axis) with respect to the carrier 300 by the driving force generated by electromagnetic interaction between the plurality of magnets 510a and 520a and the plurality of driving coils 510b and 520b. A first magnet 510a of the plurality of magnets 510a and 520a and a first driving coil 510b the plurality of driving coils 510b and 520b may generate driving force in a first axis (Y-axis) direction perpendicular to the optical axis (the Z axis), and a second magnet 520a of the plurality of magnets 510a and 520a and a second driving coil 520b of the plurality of driving coils 510b and 520b may generate driving force in a second axis (X-axis) direction perpendicular to a first axis (a Y axis). Here, a second axis (an X axis) refers to an axis perpendicular to both of the optical axis (the Z axis) and the first axis (the Y axis). The plurality of magnets 510a and 520a may be disposed to be orthogonal to each other on a plane perpendicular to the optical axis (the Z axis).

The plurality of magnets 510a and 520a may be mounted on the lens holder 320, and the plurality of driving coils 510b and 520b facing the plurality of magnets 510a and 520a, respectively, may be disposed on the substrate 600 and be mounted on the housing 120.

The plurality of magnets 510a and 520a may be moved in the direction perpendicular to the optical axis (the Z axis) together with the lens holder 320, and the plurality of driving coils 510b and 520b may be fixed to the housing 120. However, according to another exemplary embodiment, positions of the plurality of magnets 510a and 520a and the plurality of driving coils 510b and 520b may be exchanged with each other.

In the present disclosure, in a shake correction process, a closed loop control manner of sensing and feeding back a position of the lens barrel 210 may be used. The shake correction unit 500 may include a position detecting unit for performing a closed loop control, and may include a second sensing yoke 530a, a target to be detected of the shake correction unit 500. The position detecting unit may include optical image stabilization (OIS) sensing coils 530b and 530c disposed along the X axis. The second sensing yoke 530a may be attached to the lens holder 320, and the OIS sensing coils 530b and 530c may be disposed on the substrate 600 and be mounted on the housing 120. The second sensing yoke 530a and the OIS sensing coils 530b and 530c may face each other in the direction perpendicular to the optical axis (the Z axis).

Inductances of the OIS sensing coils 530b and 530c may be changed depending on movement of the second sensing yoke 503a facing the OIS sensing coils 530b and 530c. The position detecting unit may detect the position of the lens barrel 210 from the changes in the inductances of the OIS sensing coils 530b and 530c depending on movement of the second sensing yoke in two directions (the X-axis direction and the Y-axis direction) perpendicular to the optical axis.

When the second sensing yoke 530a is moved in the X-axis direction, areas of the second sensing yokes 530a overlapping the OIS sensing coils 530b and 530c may be changed, and the inductances of the OIS sensing coils 530b and 530c may thus be changed. When the second sensing yoke 530a is moved in the Y-axis direction, distances between the OIS sensing coils 530b and 530c and the second sensing yokes 530a may be changed, and the inductances of the OIS sensing coils 530b and 530c may thus be changed.

The position detecting unit of the shake correction unit 500 may further include one or more capacitors in order to determine a displacement of the lens barrel 210 from the changes in the inductances of OIS sensing coils 530b and 530c. One or more capacitors and the OIS sensing coils 530b and 530c may form a predetermined oscillation circuit. As an example, the number of capacitors may correspond to that of OIS sensing coils 530b and 530c, and one capacitor and one sensing coil may be configured in a form such as a predetermined LC oscillator or be configured in a form such as any well-known Colpitts oscillator.

The position detecting unit of the shake correction unit 500 may determine the displacement of the lens barrel 210 from the change in the frequency of the oscillation signal generated by the oscillation circuit. In detail, when the inductances of the OIS sensing coils 530b and 530c forming the oscillation circuit are changed, the frequency of the oscillation signal generated by the oscillation circuit may be changed, and the displacement of the lens barrel 210 may thus be detected on the basis of the change in the frequency.

Meanwhile, the position detecting unit of the shake correction unit 500 may further include a reference coil 530d provided at one side of the OIS sensing coils 530b and 530c. The position detecting unit of the shake correction unit 500 may generate an oscillation signal corresponding to an inductance of the reference coil 530d, and may calculate a common noise component introduced into the camera module from a frequency of the generated oscillation signal. The position detecting unit of the shake correction unit 500 may remove the common noise component from the frequency of the oscillation signal calculated from the OIS sensing coils 530b and 530c to improve reliability of detection of the displacement of the lens barrel 210.

Meanwhile, the camera module 100 may include a plurality of ball members supporting the shake correction unit 500. The plurality of ball members may serve to guide movement of the frame 310, the lens holder 320, and the lens barrel 210 in the shake correction process. In addition, the plurality of ball members may serve to maintain an interval between the carrier 300, the frame 310, and the lens holder 320.

The plurality of ball members may include first ball members B2 and second ball members B3. The first ball members B2 may guide movement of the frame 310, the lens holder 320, and the lens barrel 210 in the first axis (Y-axis) direction, and the second ball members B3 may guide movement of the lens holder 320 and the lens barrel 210 in the second axis (X-axis) direction.

As an example, the first ball members B2 may be moved in a rolling motion in the first axis (Y-axis) direction when driving force in the first axis (Y-axis) direction is generated. Therefore, the first ball members B2 may guide the movement of the frame 310, the lens holder 320, and the lens barrel 210 in the first axis (Y-axis) direction. In addition, the second ball members B3 may be moved in a rolling motion in the second axis (X-axis) direction when driving force in the second axis (X-axis) direction is generated. Therefore, the second ball members B3 may guide the movement of the lens holder 320 and the lens barrel 210 in the second axis (X-axis) direction.

The first ball members B2 may include a plurality of ball members disposed between the carrier 300 and the frame 310, and the second ball members B3 may include a plurality of ball members disposed between the frame 310 and the lens holder 320.

First guide groove portions 301 accommodating the first ball members B2 therein may be formed, respectively, in surfaces of the carrier 300 and the frame 310 facing each other in the optical axis (Z-axis) direction. The first guide groove portions 301 may include a plurality of guide grooves corresponding to the plurality of ball members of the first ball members B2. The first ball members B2 may be accommodated in the first guide groove portions 301 and be fitted between the carrier 300 and the frame 310. Movement of the first ball members B2 may be restricted in the optical axis (Z-axis) direction and the second axis (X-axis) direction and the first ball members B2 may be moved in only the first axis (Y-axis) direction, in a state in which the first ball members B2 are accommodated in the first guide groove portions 301. As an example, the first ball members B2 may be moved in a rolling motion in only the first axis (Y-axis) direction. To this end, a plane shape of each of the plurality of guide grooves of the first guide groove portions 301 may be a rectangular shape having a length in the first axis (Y-axis) direction.

Second guide groove portions 311 accommodating the second ball members B3 therein may be formed, respectively, in surfaces of the frame 310 and the lens holder 320 facing each other in the optical axis (Z-axis) direction. The second guide groove portions 311 may include a plurality of guide grooves corresponding to the plurality of ball members of the second ball members B3.

The second ball members B3 may be accommodated in the second guide groove portions 311 and be fitted between the frame 310 and the lens holder 320. Movement of the second ball members B3 may be restricted in the optical axis (Z-axis) direction and the first axis (Y-axis) direction and the second ball members B3 may only be moved in the second axis (X-axis) direction, in a state in which the second ball members B3 are accommodated in the second guide groove portions 311. As an example, the second ball members B3 may be moved in a rolling motion only in the second axis (X-axis) direction. To this end, a plane shape of each of the plurality of guide grooves of the second guide groove portions 311 may be a rectangular shape having a length in the second axis (X-axis) direction.

Meanwhile, in the present disclosure, third ball members B4 supporting movement of the lens holder 320 may be provided between the carrier 300 and the lens holder 320. The third ball members B4 may guide both movement of the lens holder 320 in the first axis (Y-axis) direction and movement of the lens holder 320 in the second axis (X-axis) direction.

As an example, the third ball members B4 may be moved in a rolling motion in the first axis (Y-axis) direction when driving force in the first axis (Y-axis) direction is generated. Therefore, the third ball members B4 may guide the movement of the lens holder 320 in the first axis (Y-axis) direction.

In addition, the third ball members B4 may be moved in a rolling motion in the second axis (X-axis) direction when driving force in the second axis (X-axis) direction is generated. Therefore, the third ball members B4 may guide the movement of the lens holder 320 in the second axis (X-axis) direction. Meanwhile, the second ball members B3 and the third ball members B4 may be in contact with and support the lens holder 320.

Third guide groove portions 302 accommodating the third ball members B4 therein may be formed, respectively, in surfaces of the carrier 300 and the lens holder 320 facing each other in the optical axis (Z-axis) direction. The third ball members B4 may be accommodated in the third guide groove portions 302 and be fitted between the carrier 300 and the lens holder 320. Movement of the third ball members B4 may be restricted in the optical axis (Z-axis) direction and the third ball members B4 may be moved in a rolling motion in the first axis (Y-axis) direction and the second axis (X-axis) direction, in a state in which the third ball members B4 are accommodated in the third guide groove portions 302. To this end, a plane shape of each of the third guide groove portions 302 may be a circular shape. Therefore, the third guide groove portions 302 may have a plane shape different from that of the first and second guide groove portions 301 and 311.

The first ball members B2 may be movable in the rolling motion in the first axis (Y-axis) direction, the second ball members B3 may be movable in the rolling motion in the second axis (X-axis) direction, and the third ball members B4 may be movable in the rolling motion in the first axis (Y-axis) direction and the second axis (X-axis) direction. Therefore, the plurality of ball members supporting the shake correction unit 500 according to the present disclosure may have a difference in a degree of freedom. Here, the degree of freedom refers to the number of independent variables required for representing a motion state of an object in a three-dimensional (3D) coordinates system. Generally, in the 3D coordinates system, a degree of freedom of the object may be 6. Movement of the object may be represented by an orthogonal coordinate system having three directions and a rotary coordinate system having three directions. As an example, in the 3D coordinates system, the object may be moved in a translation motion along the respective axes (the X axis, the Y axis, and the Z axis), and may be moved in a rotation motion in relation to the respective axes (the X axis, the Y axis, and the Z axis).

In the present specification, the degree of freedom refers to the number of independent variables required for representing movement of the first ball members B2, the second ball members B3, and the third ball members B4 when the shake correction unit 500 is moved by the driving force generated in the direction perpendicular to the optical axis (the Z axis) by applying electric power to the shake correction unit 500. As an example, the third ball members B4 may be moved in the rolling motion along two axes (the first axis (the Y axis) and the second axis (the X axis)), and the first ball members B2 and the second ball members B3 may be moved in the rolling motion along one axis (the first axis (the Y axis) or the second axis (the X axis)), by the driving force generated in the direction perpendicular to the optical axis (the Z axis). Therefore, a degree of freedom of the third ball members B4 may be greater than that of the first ball members B2 and the second ball members B3.

When the driving force is generated in the first axis (Y-axis) direction, the frame 310, the lens holder 320, and the lens barrel 210 may be moved together in the first axis (Y-axis) direction. Here, the first ball members B2 and the third ball members B4 may be moved in the rolling motion along the first axis (the Y-axis). In this case, the movement of the second ball members B3 may be restricted.

In addition, when the driving force is generated in the second axis (X-axis) direction, the lens holder 320 and the lens barrel 210 may be moved in the second axis (X-axis) direction. Here, the second ball members B3 and the third ball members B4 may be moved in the rolling motion along the second axis (the X-axis). In this case, the movement of the first ball members B2 may be restricted.

Meanwhile, in the present disclosure, a plurality of yokes 510c and 520c may be provided so that the shake correction unit 500 and the first to third ball members B2, B3, and B4 are maintained in a state in which they are in contact with each other. The plurality of yokes 510c and 520c may be fixed to the carrier 300, and may be disposed to face the plurality of magnets 510a and 520a, respectively, in the optical axis (Z-axis) direction. Therefore, attractive force may be generated in the optical axis (Z-axis) direction between the plurality of yokes 510c and 520c and the plurality of magnets 510a and 520a. Since the shake correction unit 500 is pressed toward the plurality of yokes 510c and 520c by the attractive force between the plurality of yokes 510c and 520c and the plurality of magnets 510a and 520a, the frame 310 and the lens holder 320 of the shake correction unit 500 may be maintained in a state in which they are in contact with the first to third ball members B2, B3, and B4. The plurality of yokes 510c and 520c may be formed of a material that may generate the attractive force between the plurality of yokes 510c and 520c and the plurality of magnets 510a and 520a. As an example, the plurality of yokes 510c and 520c may be formed of a magnetic material.

In the present disclosure, the plurality of yokes 510c and 520c may be provided so that the frame 310 and the lens holder 320 may be maintained in the state in which they are in contact with the first to third ball members B2, B3, and B4, and a stopper 330 may be provided in order to prevent the first to third ball members B2, B3, and B4, the frame 310, and the lens holder 320 from being externally separated from the carrier 300 due to external impacts, or the like. The stopper 330 may be coupled to the carrier 300 to cover at least a portion of an upper surface of the lens holder 320.

Figure 3:
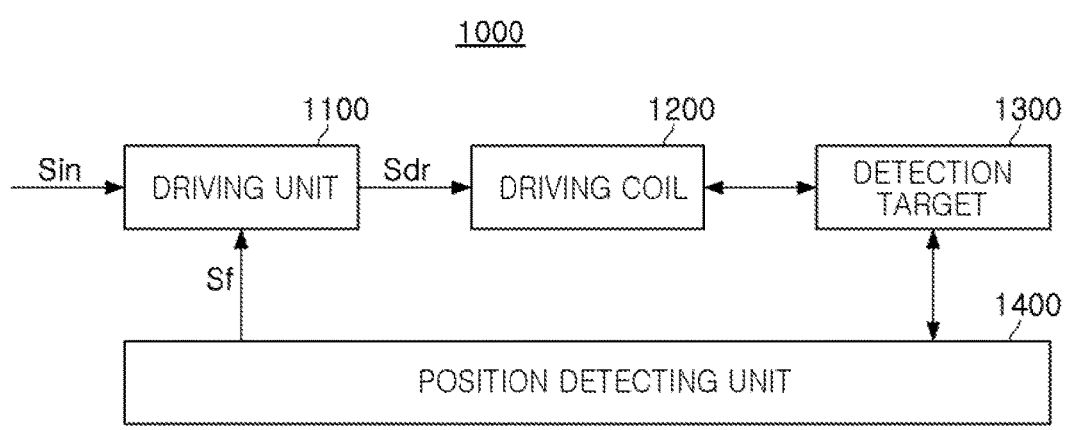
FIG. 3 is a block diagram illustrating main units of an actuator used in the camera module according to an exemplary embodiment in the present disclosure.

FIG. 3 is a block diagram illustrating main units of an actuator used in the camera module according to an exemplary embodiment in the present disclosure. An actuator 1000 according to an exemplary embodiment of FIG. 3 may correspond to the focusing unit 400 and the shake correction unit 500 of FIG. 2A.

When the actuator 1000 of FIG. 3 corresponds to the focusing unit 400 of FIG. 2A, the actuator 1000 may move the lens barrel in the optical axis direction in order to perform an autofocusing (AF) function of the camera module. Therefore, when the actuator 1000 of FIG. 3 performs the autofocusing function, a driving unit 1100 may apply a driving signal to a driving coil 1200 to provide driving force in the optical axis direction to the lens barrel.

When the actuator 1000 of FIG. 3 corresponds to the shake correction unit 500 of FIG. 2A, the actuator 1000 may move the lens barrel in the direction perpendicular to the optical axis in order to perform an OIS function of the camera module. Therefore, when the actuator 1000 of FIG. 3 performs the OIS function, the driving unit 1100 may apply a driving signal to the driving coil 1200 to provide driving force in the direction perpendicular to the optical axis to a detection target 1300.

The actuator 1000 according to the exemplary embodiment in the present disclosure may include the driving unit 1100, the driving coil 1200, the detection target 1300, and a position detecting unit 1400.

The driving unit 1100 may generate a driving signal Sdr depending on an input signal Sin applied from an external source and a feedback signal Sf generated by the position detecting unit 1400, and may provide the generated driving signal Sdr to the driving coil 1200.

When the driving signal Sdr is applied from the driving unit 1100 to the driving coil 1200, the lens barrel may move in the direction perpendicular to the optical axis by electromagnetic interaction between the driving coil 1200 and a magnet.

The position detecting unit 1400 may detect a position of the lens barrel moved by the electromagnetic interaction between the driving coil 1200 and the magnet through the detection target 1300 to generate the feedback signal Sf, and provide the feedback signal Sf to the driving unit 1100.

The detection target 1300 may be provided at one side of the lens barrel to move in the same direction as a moving direction of the lens barrel. The detection target 1300, provided at one side of the lens barrel may face a sensing coil of the position detecting unit 1400. According to another exemplary embodiment, the detection target 1300 may be provided on a plurality of frames coupled to the lens barrel, in addition to the lens barrel. The detection target 1300 may be formed of one of a magnetic material and a conductor. As an example, the detection target 1300 may correspond to the magnet 410, the first sensing yoke 460, and the second sensing yoke 530a of FIG. 2A.

The position detecting unit 1400 may include one or more sensing coils, and convert inductances of the sensing coils changed depending on movement of the detection target 1300 into frequencies to detect a position of the detection target 1300. In this case, one or more sensing coils included in the position detecting unit 1400 may correspond to one or more sensing coils included in the focusing unit 400 and the shake correction unit 500 of FIG. 2A.

Figure 4:
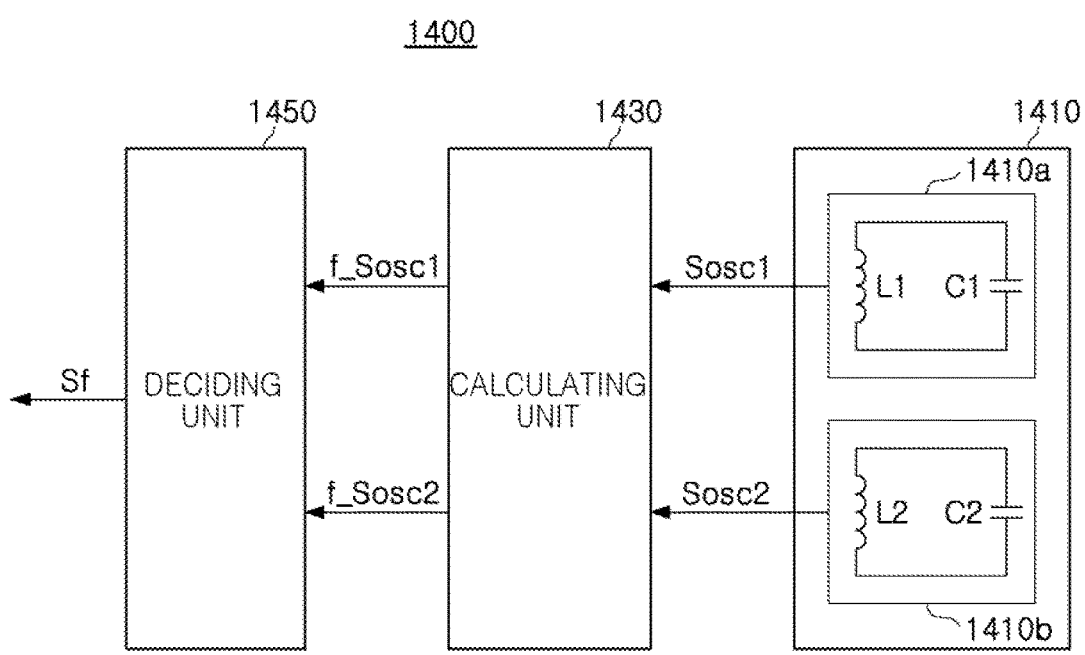
FIG. 4 is a block diagram illustrating a position detecting unit according to an exemplary embodiment in the present disclosure.

FIG. 4 is a block diagram illustrating a position detecting unit according to an exemplary embodiment in the present disclosure. An operation of detecting the position of the detection target 1300 by the position detecting unit 1400 will hereinafter be described with reference to FIGS. 2A through 4.

The position detecting unit 1400 according to the exemplary embodiment may include an oscillating unit 1410, a calculating unit 1430, and a deciding unit 1450.

The oscillating unit 1410 may include a plurality of oscillation circuits to generate a plurality of oscillation signals Sosc. The plurality of oscillation circuits may include a first oscillation circuit 1410a and a second oscillation circuit 1410b. Each of the first oscillation circuit 1410a and the second oscillation circuit 1410b may include a sensing coil and a capacitor to constitute a predetermined LC oscillator. In detail, the first oscillation circuit 1410a may include a first sensing coil L1 and a first capacitor C1, and the second oscillation circuit 1410b may include a second sensing coil L2 and a second capacitor C2. Here, the first sensing coil L1 and the second sensing coil L2 included in the first oscillation circuit 1410a and the second oscillation circuit 1410b, respectively, may correspond to the AF sensing coils 470a and 470b included in the focusing unit 400 of FIG. 2A or correspond to one or more OIS sensing coils 530b and 530c included in the shake correction unit 500 of FIG. 2A.

The first sensing coil L1 and the second sensing coil L2 may detect a displacement of the detection target 1300 facing the first sensing coil L1 and the second sensing coil L2. The first sensing coil L1 and the second sensing coil L2 may detect a displacement of the detection target 1300 in a direction perpendicular to a surface on which the first sensing coil L1 and the second sensing coil L2 are disposed. Since the first sensing coil L1 and the second sensing coil L2 are disposed on the same surface, inductances of the first sensing coil L1 and the second sensing coil L2 may be changed in the same direction depending on movement of the detection target 1300 in the direction perpendicular to the surface on which the first sensing coil L1 and the second sensing coil L2 are disposed. Referring to FIG. 2A, when the first sensing coil L1 and the second sensing coil L2 correspond to one or more OIS sensing coils 530b and 530c included in the shake correction unit 500 of FIG. 2A, the OIS sensing coils 530b and 530c may detect a displacement, in the Y-axis direction, of the second sensing yoke 530a disposed to face the OIS sensing coils 530b and 530c.

In addition, the first sensing coil L1 and the second sensing coil L2 may detect a displacement of the detection target 1300 in a direction on which the first sensing coil L1 and the second sensing coil L2 are disposed. When the detection target 1300 moves in the direction in which the first sensing coil L1 and the second sensing coil L2 are disposed, inductances of the first sensing coil L1 and the second sensing coil L2 may be changed in different directions. Referring to FIG. 2A, when the first sensing coil L1 and the second sensing coil L2 correspond to one or more OIS sensing coils 530b and 530c included in the shake correction unit 500 of FIG. 2A, the OIS sensing coils 530b and 530c may detect a displacement, in the X-axis direction, of the second sensing yoke 530a disposed to face the OIS sensing coils 530b and 530c. In addition, when the first sensing coil L1 and the second sensing coil L2 correspond to the AF sensing coils 470a and 470b included in the focusing unit 400 of FIG. 2A, the AF sensing coils 470a and 470b may detect a displacement, in the Z-axis direction, of the first sensing yoke disposed to face the AF sensing coils 470a and 470b.

The first oscillation circuit 1410a and the second oscillation circuit 1410b, which are schematically illustrated in FIG. 4, may be configured in a form of various types of well-known oscillators.

Frequencies of oscillation signals Sosc of the first oscillation circuit 1410a and the second oscillation circuit 1410b may be determined by an inductance of the first sensing coil L1, an inductance of the second sensing coil L2, a capacitance of the first capacitor C1, and a capacitance of the second capacitor C2. When the oscillation circuit is implemented by the LC oscillator including the sensing coil and the capacitor, the frequency f of the oscillation signal Sosc may be represented by Equation 1. In Equation 1, l indicates inductances of the first sensing coil L1 and the second sensing coil L2, and c indicates capacitances of the first capacitor C1 and the second capacitor C2.

$$f = \frac{1}{2\pi\sqrt{lc}}$$ [Equation 1]

When the detection target 1300 moves together with the lens barrel, strength of a magnetic field of the detection target 1300 having an influence on the inductances of the first sensing coil L1 and the second sensing coil L2 of the oscillation unit 1410 is changed, and the inductances of the first sensing coil L1 and the second sensing coil L2 may thus be changed. Therefore, frequencies of a first oscillation signal Sosc1 and a second oscillation signal Sosc2 output from the first oscillation circuit 1410a and the second oscillation circuit 1410b, respectively, may be changed depending on the movement of the detection target 1300. According to the exemplary embodiment in the present disclosure, a magnetic material having a high magnetic permeability may be disposed between the detection target 1300 and the oscillating unit 1410 in order to increase change ratios in the inductances of the first sensing coil L1 and the second sensing coil L2 depending on the movement of the detection target 1300.

According to the exemplary embodiment in the present disclosure, frequency ranges of the first oscillation signal Sosc1 and the second oscillation signal Sosc2 generated by the first oscillation circuit 1410a and the second oscillation circuit 1410b, respectively, may be different from each other. As an example, a frequency range of the first oscillation signal Sosc1 may correspond to a low frequency region, and a frequency range of the second oscillation signal Sosc2 may correspond to a high frequency region.

According to the exemplary embodiment in the present disclosure, two oscillation circuits disposed adjacent to each other may generate oscillation signals having different frequency ranges to prevent interference between a plurality of oscillation signals.

In order to generate the oscillation signals having the different frequency ranges, the inductance of the first sensing coil L1 and the capacitance of the first capacitor C1 of the first oscillation circuit 1410a may be different from the inductance of the second sensing coil L2 and the capacitance of the second capacitor C2 of the second oscillation circuit 1410b. As an example, inductances of the first oscillation circuit 1410a and the second oscillation circuit 1410b may be the same as each other and capacitances of the first oscillation circuit 1410a and the second oscillation circuit 1410b may be different from each other, capacitances of the first oscillation circuit 1410a and the second oscillation circuit 1410b may be the same as each other and inductances of the first oscillation circuit 1410a and the second oscillation circuit 1410b may be different from each other, or both of capacitances and inductances of the first oscillation circuit 1410a and the second oscillation circuit 1410b may be different from each other.

Meanwhile, according to another exemplary embodiment, the two oscillation circuits may generate oscillation signals in the same frequency region, unlike the above description. To this end, inductances and capacitances of the first oscillation circuit 1410a and the second oscillation circuit 1410b may be the same as each other.

The calculating unit 1430 may calculate frequencies f_Sosc1 and f_Sosc2 of the first oscillation signal Sosc1 and the second oscillation signal Sosc2 output, respectively, from the first oscillation circuit 1410*a* and the second oscillation circuit 1410*b*. As an example, the calculating unit 1430 may calculate the frequencies f_Sosc1 and f_Sosc2 of the first oscillation signal Sosc1 and the second oscillation signal Sosc2 using a reference clock CLK. In detail, the calculating unit 1430 may count the first oscillation signal Sosc1 and the second oscillation signal Sosc2 using the reference clock CLK. The reference clock CLK may be a clock signal having a very high frequency, and when the first oscillation signal Sosc1 and the second oscillation signal Sosc2 during a reference period, for example, one cycle are counted using the reference clock CLK, a count value of the reference clock CLK corresponding to the first oscillation signal Sosc1 and the second oscillation signal Sosc2 during one cycle may be calculated. The calculating unit 1430 may calculate the frequencies f_Sosc1 and f_Sosc2 of the first oscillation signal Sosc1 and the second oscillation signal Sosc2 using the count value of the reference clock CLK and a frequency of the reference clock CLK.

The deciding unit 1450 may receive the frequencies f_Sosc1 and f_Sosc2 of the first oscillation signal Sosc1 and the second oscillation signal Sosc2 from the calculating unit 1430, and determine the position of the detection target 1300 depending on the frequencies f_Sosc1 and f_Sosc2 of the first oscillation signal Sosc1 and the second oscillation signal Soscs2. The deciding unit 1450 may include a memory, and position information of the detection target 1300 corresponding to a frequency f_Sosc of the oscillation signal Sosc may be stored in the memory. The memory may be implemented by a non-volatile memory including one of a flash memory, an electrically erasable programmable read-only memory (EEPROM), and a ferroelectric random access memory (FeRAM).

When the frequencies f_Sosc1 and f_Sosc2 of the first oscillation signal Sosc1 and the second oscillation signal Sosc2 are transferred from the calculating unit 1430 to the deciding unit 1450, the deciding unit 1450 may determine the position of the detection target 1300 depending on the position information of the detection target 1300, stored in the memory.

Figure 5A:
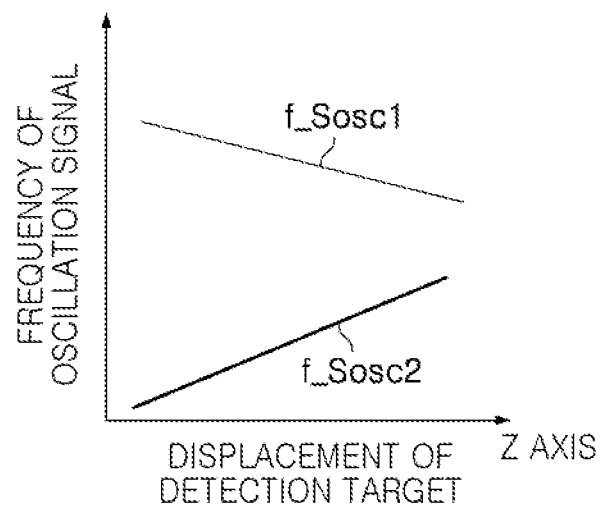
FIGS. 5A and 5B are graphs illustrating frequencies of a plurality of oscillation signals depending on movement of a detection target in a Z-axis direction according to an exemplary embodiment in the present disclosure.
Figure 5B:
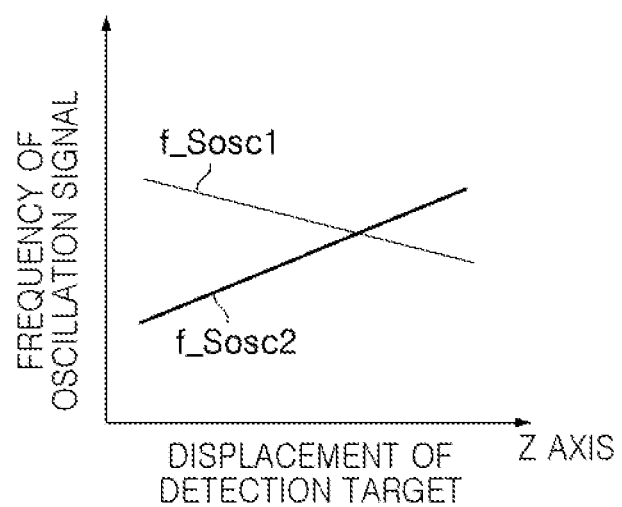

FIGS. 5A and 5B are graphs illustrating frequencies of a plurality of oscillation signals depending on movement of a detection target in a Z-axis direction according to an exemplary embodiment in the present disclosure.

In the present exemplary embodiment, it may be assumed that the first sensing coil L1 and the second sensing coil L2 correspond to the AF sensing coils 470*a* and 470*b* included in the focusing unit 400 of FIG. 2A. When the detection target 1300 moves in the Z-axis direction, inductances of the first sensing coil L1 and the second sensing coil L2 may be increased or decreased in different directions. Therefore, when the detection target 1300 moves in the Z-axis direction, change directions of the frequencies of the first oscillation signal Sosc1 and the second oscillation signal Sosc2 generated by the first sensing coil L1 and the second sensing coil L2, respectively, may be different from each other.

Referring to FIG. 5A, frequency ranges of the first oscillation signal Sosc1 and the second oscillation signal Sosc2 may be different from each other. As an example, the highest frequency of the second oscillation signal Sosc2 in a low frequency region may be lower than the lowest frequency of the first oscillation signal Sosc1 in a high frequency region.

According to the exemplary embodiment in the present disclosure, two oscillation circuits disposed adjacent to each other may generate oscillation signals having different frequency ranges to prevent interference between a plurality of oscillation signals. Meanwhile, referring to FIG. 5B, unlike FIG. 5A, frequency ranges of the first oscillation signal Sosc1 and the second oscillation signal Sosc2 may be the same as each other, such that frequencies of the first oscillation signal Sosc1 and the second oscillation signal Sosc2 may intersect with each other at one point.

Figure 6A:
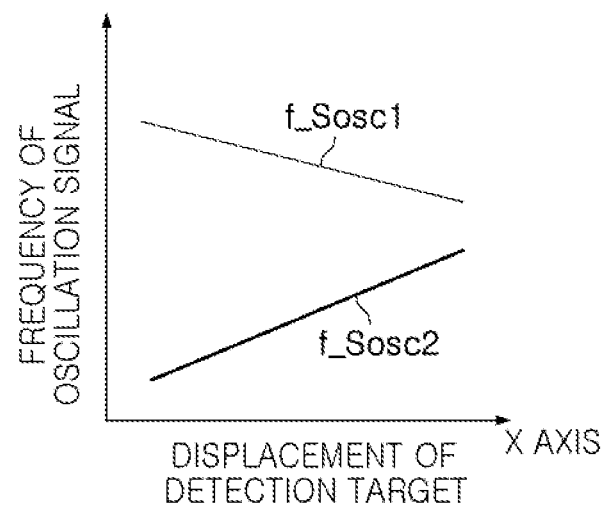
FIGS. 6A and 6B are graphs illustrating frequencies of a plurality of oscillation signals depending on movement of the detection target in an X-axis direction according to an exemplary embodiment in the present disclosure.
Figure 6B:
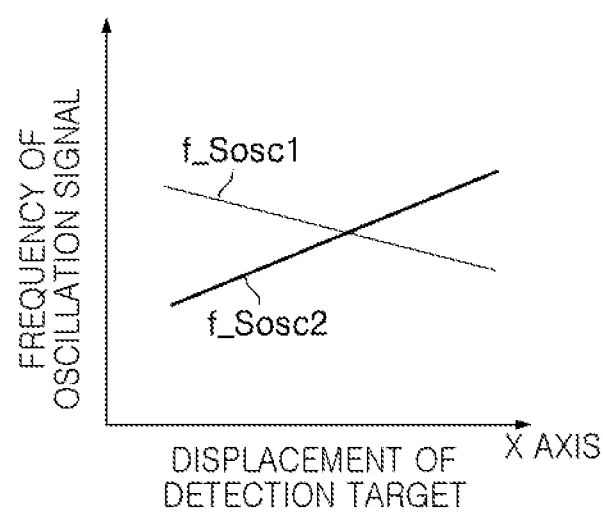

FIGS. 6A and 6B are graphs illustrating frequencies of a plurality of oscillation signals depending on movement of the detection target in an X-axis direction according to an exemplary embodiment in the present disclosure.

In the present exemplary embodiment, it may be assumed that the first sensing coil L1 and the second sensing coil L2 correspond to one or more OIS sensing coils 530*b* and 530*c* included in the shake correction unit 500 of FIG. 2A. When the detection target 1300 moves in the X-axis direction, inductances of the first sensing coil L1 and the second sensing coil L2 may be increased or decreased in different directions. Therefore, when the detection target 1300 moves in the X-axis direction, change directions of the frequencies of the first oscillation signal Sosc1 and the second oscillation signal Sosc2 generated by the first sensing coil L1 and the second sensing coil L2, respectively, may be different from each other.

Referring to FIG. 6A, frequency ranges of the first oscillation signal Sosc1 and the second oscillation signal Sosc2 may be different from each other. As an example, the highest frequency of the second oscillation signal Sosc2 in a low frequency region may be lower than the lowest frequency of the first oscillation signal Sosc1 in a high frequency region.

According to the exemplary embodiment in the present disclosure, two oscillation circuits disposed adjacent to each other may generate oscillation signals having different frequency ranges to prevent interference between a plurality of oscillation signals. Meanwhile, referring to FIG. 6B, unlike FIG. 6A, frequency ranges of the first oscillation signal Sosc1 and the second oscillation signal Sosc2 may be the same as each other, such that frequencies of the first oscillation signal Sosc1 and the second oscillation signal Sosc2 may intersect with each other at one point.

Figure 7:
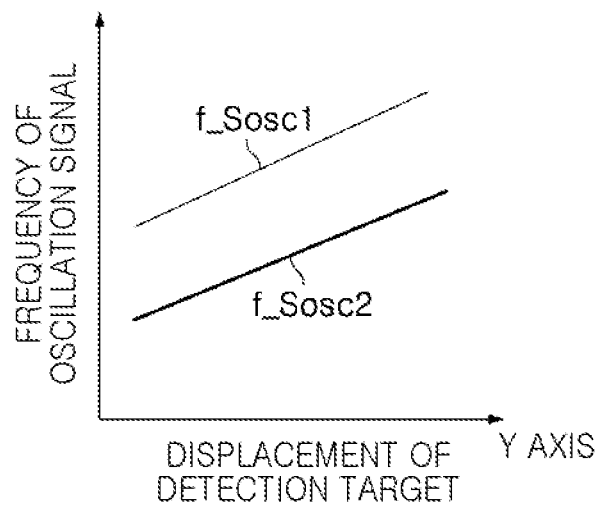
FIG. 7 is graphs illustrating frequencies of a plurality of oscillation signals depending on movement of the detection target in a Y-axis direction according to an exemplary embodiment in the present disclosure.

FIG. 7 is graphs illustrating frequencies of a plurality of oscillation signals depending on movement of the detection target in a Y-axis direction according to an exemplary embodiment in the present disclosure.

In the present exemplary embodiment, it may be assumed that the first sensing coil L1 and the second sensing coil L2 correspond to one or more OIS sensing coils 530*b* and 530*c* included in the shake correction unit 500 of FIG. 2A. When the detection target 1300 moves in the Y-axis direction, inductances of the first sensing coil L1 and the second sensing coil L2 may be increased or decreased in the same direction. Therefore, when the detection target 1300 moves in the Y-axis direction, change directions of the frequencies of the first oscillation signal Sosc1 and the second oscillation signal Sosc2 generated by the first sensing coil L1 and the second sensing coil L2, respectively, may be the same as each other.

Referring to FIG. 7, frequency ranges of the first oscillation signal Sosc1 and the second oscillation signal Sosc2 may be different from each other. Meanwhile, the highest frequency of the second oscillation signal Sosc2 in a low frequency region may be higher than the lowest frequency of the first oscillation signal Sosc1 in a high frequency region. That is, frequencies of the first oscillation signal Sosc1 and the second oscillation signal Sosc2 may overlap each other in a partial frequency range.

The frequencies of the first oscillation signal Sosc1 and the second oscillation signal Sosc2 may overlap each other in the partial frequency range, but change directions of the frequencies of the first oscillation signal Sosc1 and the second oscillation signal Sosc2 may be the same as each other to prevent interference between a plurality of oscillation signals.

Meanwhile, a case in which frequency ranges of at least two oscillation signals generated in the actuator of the focusing unit are different from each other or frequency ranges of at least two oscillation signals generated in the actuator of the shake correction unit are different from each other is described in the abovementioned exemplary embodiment, but frequency ranges of at least two oscillation signals generated in the actuator of the focusing unit may be different from those of at least two oscillation signals generated in the actuator of the shake correction unit, according to another exemplary embodiment.

That is, the focusing unit and the shake correction unit may generate oscillation signals having different frequency ranges to prevent frequency interference between position detecting operations of the lens barrel or the detection target each performed by the focusing unit and the shake correction unit, thereby securing reliability of the position detecting operations.

An operation of deciding the position of the magnet under the assumption that the two sensing coils are provided has been described hereinabove, but at least two sensing coils may be provided, and the abovementioned manner may also be applied to a case in which the at least two sensing coils are provided.

As set forth above, the actuator of a camera module according to the exemplary embodiment in the present disclosure may precisely detect the position of the lens barrel from the changes in the inductances of the sensing coils. Further, the actuator of a camera module does not use a separate hall sensor, such that a manufacturing cost of the actuator of a camera module may be reduced and space efficiency of the actuator of a camera module may be improved.

While exemplary embodiments have been shown and described above, it will be apparent to those skilled in the art that modifications and variations could be made without departing from the scope of the present invention as defined by the appended claims.

What is claimed is:

1. An actuator of a camera module, comprising:
   a detection target; and
   a position detecting unit disposed to face the detection target and including at least two sensing coils respectively forming at least two oscillation circuits,
   wherein the position detecting unit detects a position of the detection target depending on at least two oscillation signals generated by the at least two oscillation circuits and having different frequency ranges.

2. The actuator of a camera module of claim 1, wherein the position detecting unit detects a displacement of the detection target in a direction perpendicular to a surface on which the at least two sensing coils are disposed.

3. The actuator of a camera module of claim 2, wherein frequencies of the at least two oscillation signals are increased or decreased in the same direction, depending on movement of the detection target.

4. The actuator of a camera module of claim 1, wherein the position detecting unit detects a displacement of the detection target in a direction in which the at least two sensing coils are disposed.

5. The actuator of a camera module of claim 2, wherein frequencies of the at least two oscillation signals are increased or decreased in different directions, depending on movement of the detection target.

6. The actuator of a camera module of claim 1, wherein one of the at least two oscillation circuits generates the oscillation signal in a low frequency region, and the other of the at least two oscillation circuits generates the oscillation signal in a high frequency region.

7. The actuator of a camera module of claim 6, wherein a highest frequency of the oscillation signal in the low frequency region is lower than a lowest frequency of the oscillation signal in the high frequency region.

8. The actuator of a camera module of claim 1, wherein each of the at least two oscillation circuits includes a capacitor implementing a predetermined oscillator together with each of the at least two sensing coils.

9. The actuator of a camera module of claim 8, wherein the frequency ranges of the at least two oscillation signals are determined depending on an inductance of the sensing coil included in each of the at least two oscillation circuits and a capacitance of the capacitor included in each of the at least two oscillation circuits.

10. The actuator of a camera module of claim 9, wherein an inductance of the sensing coil included in one of the at least two oscillation circuits is different from that of the sensing coil included in the other of the at least two oscillation circuits.

11. The actuator of a camera module of claim 9, wherein a capacitance of the capacitor included in one of the at least two oscillation circuits is different from that of the capacitor included in the other of the at least two oscillation circuits.

12. A camera module comprising:
   a lens barrel;
   a focusing unit providing driving force in an optical axis direction of the lens barrel; and
   a shake correction unit providing driving force in two directions perpendicular to an optical axis,
   wherein each of the focusing unit and the shake correction unit generates an oscillation signal of which a frequency is changed depending on movement of the lens barrel to detect a displacement of the lens barrel, and
   a frequency range of the oscillation signal generated by the focusing unit is different from that of the oscillation signal generated by the shake correction unit.

13. The camera module of claim 12, wherein the focusing unit generates at least two oscillation signals, of which frequencies are changed depending on the movement of the lens barrel, and frequency ranges of the at least two oscillation signals are different from each other.

14. The camera module of claim 12, wherein the shake correction unit generates at least two oscillation signals, of which frequencies are changed depending on the movement of the lens barrel, and frequency ranges of the at least two oscillation signals are different from each other.

15. The camera module of claim 12, wherein each of the focusing unit and the shake correction unit includes an oscillation circuit generating the oscillation signal.

16. An actuator of a camera module, comprising:
   a detection target;
   a first oscillation circuit configured to output a first oscillation signal having a first frequency range;
   a second oscillation circuit configured to output a second oscillation signal having a second frequency range;
   a position detecting unit disposed to face the detection target and configured to detect a position of the detection target based on the first oscillation signal and the second oscillation signal.

17. The actuator of a camera module of claim 16, wherein the first oscillation circuit comprises a first sensing coil and a first capacitor, and the second oscillation circuit comprises a second sensing coil and a second capacitor.

18. The actuator of a camera module of claim 17, wherein an inductance of the first sensing coil is different from an inductance of the second sensing coil, and a capacitance of the first capacitor is different from a capacitance of the second capacitor.

19. The actuator of a camera module of claim 16, wherein the first frequency range is different from the second frequency range.

20. The actuator of a camera module of claim 16, wherein the first frequency range is the same as the second frequency range.

* * * * *